Nov. 3, 1931.  A. E. OSWALD  1,829,872
ELECTRIC MOTOR
Filed Dec. 31, 1929   2 Sheets-Sheet 1
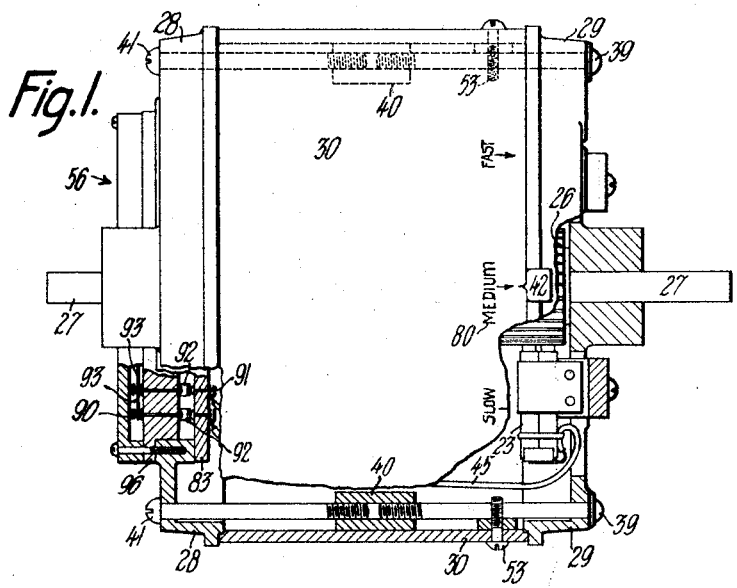
Fig.1.
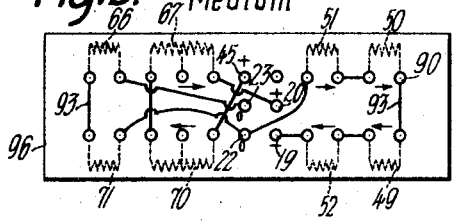
Fig.2. Medium
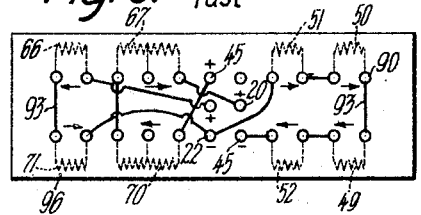
Fig.3. Fast
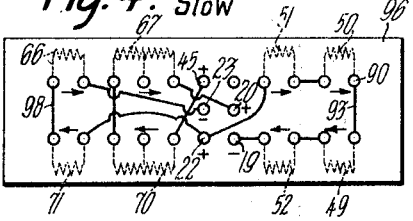
Fig.4. Slow
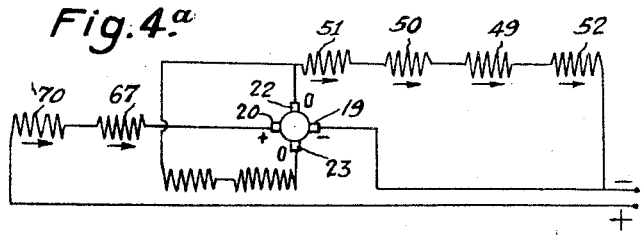
Fig.4.ᵃ
Inventor:
Alfred E Oswald
by D.C. Stickney
Attorney.

Nov. 3, 1931.   A. E. OSWALD   1,829,872
ELECTRIC MOTOR
Filed Dec. 31, 1929    2 Sheets-Sheet 2
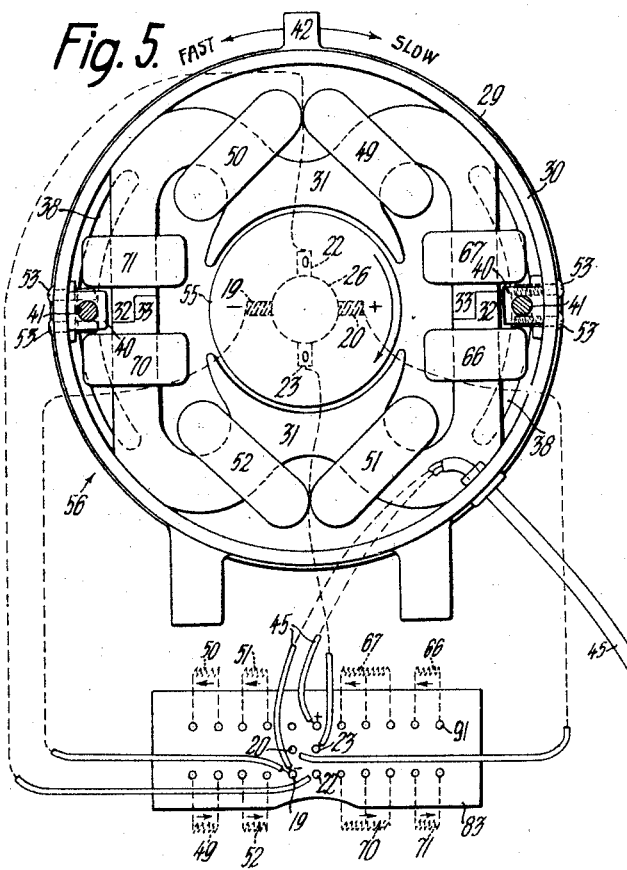
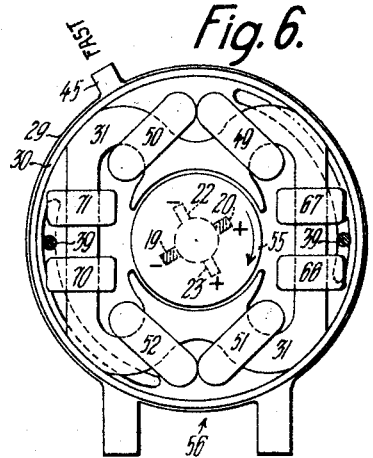
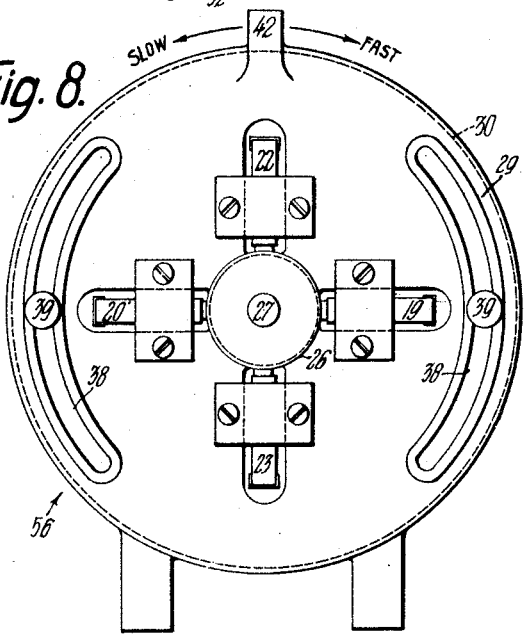
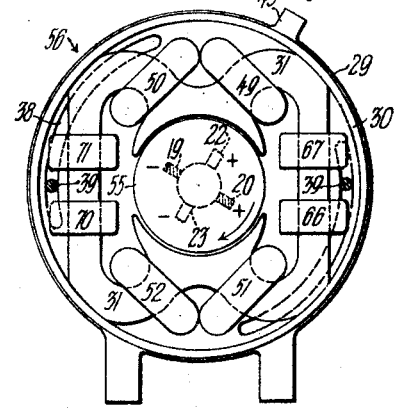
Inventor:
Alfred E Oswald
by  A B Stickney
Attorney Patented Nov. 3, 1931

1,829,872

UNITED STATES PATENT OFFICE

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE

ELECTRIC MOTOR

Application filed December 31, 1929. Serial No. 417,620.

This invention relates to electric motors for driving machines where considerable variations in speed are desired, also to motors intended for use on circuits having different characteristics, and more especially to compound wound shunt motors for driving small machines, such as typewriters, calculating machines, etc.

This invention provides a type of motor applicable also for use where it is desired to drive machines having different torques at a given normal speed, that is, where the work to be done by the motor varies in its application from one machine to another.

Another feature of this invention is the production of motors for use on different machines to be run at a given speed, the machines having various speed reductions, and which machines are not therefore suited to be driven by a motor having a fixed speed, such as an ordinary direct current shunt motor.

Another feature lies in the fact that motors embodying this invention operate at different speeds on direct current with the characteristic of an ordinary shunt motor, that is, they maintain given speeds within small limits at all different loads. This feature does away with the usual method of interpolating a rheostat in series with the armature wherein the speed of the motor cannot be maintained constant as it is a function of the torque of the motor.

Another feature lies in the great range of speed for which the motors may be adjusted and operated. It has been found, in practice, for example, that a motor embodying this invention can be adjusted to vary in speed from 1200 to 2500 revolutions per minute, whereas in motors not built along the lines of this disclosure, the speed cannot be varied, by shifting the brushes, more than from 1200 to about 1500 revolutions per minute without excessive sparking of the brushes at the commutator.

Another feature lies in the fact that rheostats and other auxiliary devices generally interpolated in the leads of the motor to vary the speed are entirely done away with so that the motor is self-contained and complete in itself without resorting to any such devices to control its speed.

Another feature relates to the provision of a number of main field-coils, connected across the main brushes, and auxiliary coils connected across a pair of auxiliary brushes, the latter mounted midway between the main brushes on the commutator and co-operative with the main field-coils to control the motor-speed. The auxiliary field-coils operate to build up or hinder the magnetic flux of the main field-coils by the reversal of current passing through them by the act of shifting the auxiliary brushes around the commutator to a greater or less extent, either side of a neutral line. This neutral line passes diametrically through the armature from the center of one pole to the center of the other, and when the auxiliary brushes occupy this position no current flows through the auxiliary coils.

Another feature of this invention lies in the fact that as the brushes are shifted on the commutator the strength of the auxiliary field-coils is changed along with the strength of the shunt field, both fields operating concomitantly to control the speed of the motor.

One of the features of this invention lies in the ability to adjust motors to compensate for deviations from the normal voltage, so that the motors will run on different voltages at the proper speed to do the work.

Another feature of the invention consists in so connecting the various field-windings to main and auxiliary brushes that as the brushes are shifted in the direction of armature-rotation, for example, to slow down the motor, according to the well-known law, the voltage on these windings is increased by that act to strengthen the field and still further slow the motor down, and vice versa.

In this motor the variations, in the resultant magnetic flux of the field, are obtained partly from the auxiliary field-windings being effective to boost or oppose the main field-flux and partly from the change of voltage at the terminals of the shunt field. If the auxiliary brushes are mounted in the neutral position shown in Figure 5, the motor will be running, at its average speed, with no current passing through the auxiliary field-coils.

The embodiment of this invention is similar in a number of respects to the construction of the motor disclosed in my Patent 1,554,647 of September 22, 1925, wherein a cylindrical field-structure is formed of annular laminations upon which are mounted main and also auxiliary field-coils, and wherein a head at one end of the motor-casing is supplied with a terminal plate and a converter-plate, the latter having interchangeable connections to accomplish the different functions for which the motor is applicable. In the present invention by using four different converter-plates and only two motors, one wound for 110 volts and the other wound for 220 volts, it is possible to adjust the motors for use not only on direct current and alternating current circuits at different voltages, but also when used on alternating circuits, the motors can be used on all frequencies from 25 to 60 cycles, and by using additional converter-plates still further adaptations can be made according to the practical requirements.

Other features and advantages will hereinafter appear.

In the accompanying drawings,

Figure 1 is a top view of the assembled motor with a portion of the casing cut away.

Figures 2, 3 and 4 show the converter-plate and its connections, and the direction of the current and the direction of the magnetic flux in each field-coil when the motor is adjusted to run at medium speed, fast speed and slow speed, respectively. Figure 4$^a$ is a line diagram, and corresponds with Figure 2, for medium speed.

Figure 5 is an end view of the motor with one head removed, showing the main and auxiliary coils mounted on the annular field-structure laminations. This view shows the brushes in the medium-speed position.

Figure 6 is similar to Figure 5, with the brushes shown in the fast-speed position.

Figure 7 is similar to Figure 5, with the brushes in the slow-speed position.

Figure 8 shows the right-hand end of the motor, as shown in Figure 1, having the main and auxiliary brushes mounted thereon.

The armature 55 of the motor 56 has a commutator 26, and a shaft 27 which rotates in heads or end-enclosures 28, 29, secured to a cylindrical tubular casing 30. The head 29 has a pair of diametrically-spaced main brushes 19 and 20, Figure 8, and a pair of similarly-spaced auxiliary brushes 22 and 23, each of which is connected to contacts 91 on a terminal plate 83. The line of the main brushes is perpendicular to that of the auxiliary brushes. The field-structure includes laminations 31 of U shape, each lamination forming half of the field-structure, the two halves of the field-structure being symmetrical and composed of the same shaped laminations, and each half forming a pole-piece for the motor. The arms of each lamination have at their ends fingers and jogs 33 and 32, respectively, which interdigitate with similar jogs and fingers on the other half of the structure, so that the field-laminations are interlocked at the joints to produce paths for the magnetic lines of force of minimum resistance. Main field-coils 49 and 50 are mounted on the upper pole-piece of the laminated field-structure, while similar coils 51 and 52 are mounted on the lower pole-piece of the field-structure. The coils 49, 50, 51 and 52 constitute the shunt field-coils of the motor. Additional field-coils 66 and 67 are mounted on the arms of one side of the lower and upper half of the field-structure, respectively, while coils 70 and 71 are mounted on the opposite side on corresponding arms of the same. The coils 67 and 70 constitute the series field-coils of the motor while coils 66 and 71 constitute the auxiliary field-coils of the same. The terminals of all of these coils are severally connected to the contacts 91 on the terminal plate 83, as shown in Figure 5. A converter-plate 96 has clips 92 thereon for engaging the contacts 91, on the terminal plate 83, and conductors 93 thereon connecting the various terminals 90 in accordance with the diagrams shown in Figures 2, 3 and 4.

It is understood, of course, that the diagrams shown in Figures 2, 3 and 4 are illustrative of but one scheme of connections, and would be applicable to adjust the motor for use to meet a given set of conditions. Various plates may be supplied for interchangeable use with the motor, so that it can be used under a great number of different conditions; the various plates having different connections thereon for varying the connections of the several coils in the motor; for example, a motor wound for use on 110 volts may have not only a plate to adjust it for use on direct current 110 volt installations, but another plate to adjust it for use on 160 volts 42 cycle alternating current; or, as a further illustration, the same motor may be adjusted by the use of other suitable converter-plates for operation on different frequencies, one plate for 25 or 30 cycles, another plate for 40 cycles, another for 50 to 60 cycles, and so on. Use of the motor for different purposes will be understood from said Patent 1,554,647.

It is seen from the above that the motor is capable of universal use, as it can be adjusted for circuits having different voltages and frequencies, and for operating at different speeds under each condition, the plates being selected to meet the condition of speed and the circuit to be used, while the shifting of the brushes co-operates therewith to influence further the speed of the motor.

Plates 96 and 83 are mounted on the head 28. The heads 28 and 29 are secured together by suitable bolts 39 and 41 which screw into a block 40 secured to the casing 30. The head 29 has two slots 38, Figure 8, each of which may receive the screw 39. When the screws 39 are loosened, the head 29 can be rotated to shift the brushes on the commutator 26 by the operator by means of a handle 42. Screws 53, one each side of the screws 39, hold the latter in position while the head is being rotated.

By rotating the head 29, the brushes 19, 20, 22 and 23 are shifted simultaneously on the commutator and the speed of the motor is increased or decreased correspondingly, depending upon the direction the brushes are shifted with reference to the direction of the armature-rotation. The casing 30, Figure 1, is provided with markings 80 to indicate to the operator which direction to rotate the head 29 to control the speed of the motor. According to the diagram of connections shown in Figures 2, 3 and 4, the current from the positive side of the mains 45 passes through the series field-coils 70 and 67, connected in series, to the positive main brush and from the negative main brush to the negative side of the line. The current through the shunt field-coils passes from the auxiliary brush 22 through coils 51, 50, 49 and 52 connected in series, and then to the negative side of the line at main brush 19. The auxiliary field-coils 71 and 66 are connected in series, and at their outer terminals across the auxiliary brushes 22 and 23. When the auxiliary brushes are in a vertical position, as shown in Figure 5, there is no difference of potential to generate any current in the auxiliary field-coils 71 and 66, and the motor is then running, as already stated, similarly to a simple compound shunt-wound motor, with the exception, however, that the shunt field-current, passing through the coils 49 to 52, is taken, in the present invention from the armature-windings between the auxiliary brush 22 and the main brush 19. These windings operate on a potential of approximately 50 volts, for example, on a 110-volt circuit (assuming there is a 10-volt drop in the series coils 67 and 70), instead of operating on the full-line potential of 110 volts, as heretofore.

If it is desired to slow down the motor from the average speed resulting from the position of parts shown in Figure 5, a clockwise shifting of the brushes, in the direction of the armature-rotation, will bring about the condition shown in Figure 7, wherein the voltage across the auxiliary brushes 22 and 23 sends current through the auxiliary coils 71 and 66, to produce magnetic lines of force in the same direction as the other field coils, with the effect that the strength of the magnetic flux is increased and the speed of the motor is lowered.

If, however, the speed of the motor is to be increased from the normal resulting from the position of parts shown in Figure 5, then the rotation counterclockwise of the brushes will cause a current to flow through the auxiliary windings 71 and 66 in the opposite direction to the above, and the magnetic flux of the coils 71, 66 will oppose the field of the remaining field-coils so that the strength of the magnetic flux of the field is weakened thereby, and the motor is caused to speed up as shown in Figure 6. When the auxiliary brushes are shifted across the neutral position, Figure 5, either from the right or from the left, the direction of the current in the auxiliary coils 71 and 66 reverses, as indicated by the plus and minus signs as applied to the auxiliary brush-terminals 22 and 23, shown in Figures 3 and 4.

The shunt field-coils 49 to 52, connected across the auxiliary brush 22 and main brush 19, are supplied with current, the amount of which also depends upon the position of the brushes, it being understood, of course, that in the position shown in Figure 7, the shunt field-coils will have their maximum current, while, in Figure 6, the shunt field-coils will have the minimum current corresponding with the minimum and maximum speeds of the motor, respectively.

It is seen from the above that this motor operates by combining three distinct principles of motor-speed regulation. In the first place the brushes are shifted and the speed of the motor responds thereto according to the well-known law that a motor slows down as the field-brushes are shifted in the direction of rotation of the armature, and vice versa. Second, as the brushes are shifted above to change the speed of the motor, the auxiliary field is strengthened or weakened by reason of the auxiliary field-windings (through which no current at all passes at normal speed), having current pass in one direction to slow down the motor and in another direction to speed up the motor; and, third, strengthening or weakening of the flux of the field is obtained by means of controlling the electromotive force applied at the terminals of the shunt field-coils.

All three of these speed-controlling features are co-operative in this disclosure to bring about the desired speed of the motor and are controlled by the single act of shifting all of the brushes on the commutator through the same angular distance.

The angle through which the brushes may be shifted, and, therefore, the greatest amount of change in speed obtainable, depends upon the shape and the position of the pole-pieces. Pole-pieces which do not extend around the armature to such an extent as others have, within certain limits, a greater possible angular displacement of the brushes, and therefore a greater possible change of speed.

Variations may be resorted to within the scope of the invention, and portions of the improvements may be used without others.

Having thus described my invention, I claim:

1. In an electric motor, an armature, a commutator, a pair of main brushes, a pair of auxiliary brushes mounted between the main brushes, all the brushes being equally spaced around the commutator, means for securing the brushes in spaced relation and for shifting the same on the commutator, series field-coils connected to one main brush in series with said armature, auxiliary field-coils connected across the auxiliary brushes, shunt field-coils connected across a main brush and an auxiliary brush, and means for shifting all the brushes to vary the strength of the field and control the speed of the motor.

2. In an electric motor, an armature, a commutator therefor, a field-structure, a pair of main brushes, a pair of auxiliary brushes, series field-coils connected, in series with the armature, to one of the main brushes, auxiliary field-coils connected across the auxiliary brushes, shunt coils connected across the other main brush and an auxiliary brush, and means for shifting all the brushes the same amount in the same direction, the brushes to which said shunt coils are connected being shiftable from a position having a given potential to a position having less potential as the brushes are shifted in a direction contrariwise to the direction of revolution of the armature, effective to weaken the field and speed up the motor.

3. In an electric motor, an armature, a commutator therefor, a field-structure, a pair of main brushes, a pair of auxiliary brushes, series field-coils connected, in series with the armature, to one of the main brushes, auxiliary field-coils connected across the auxiliary brushes, shunt coils connected across the other main brush and an auxiliary brush, and means for shifting all the brushes the same amount in the same direction, the brushes to which said shunt coils are connected being shiftable from a position having a given potential to a position having greater potential as the brushes are shifted in the same direction as the direction of revolution of the armature, effective to strengthen the field and slow down the motor.

4. In an electric motor, an armature, a commutator, a pair of main brushes, a pair of auxiliary brushes, each brush of a pair mounted between the brushes of the other pair, a field-structure including series coils, shunt coils and auxiliary coils, the series coils being connected in series with the main brushes, the auxiliary coils being connected across the auxiliary brushes, and the shunt coils being connected across an auxiliary brush and a main brush, and means for shifting all the brushes on the commutator simultaneously, whereby the operations of the auxiliary and shunt coils are caused to oppose or aid each other to create the field of the motor by changing the direction of current in the auxiliary coils, whereby the strength of the field is modified to regulate the speed of the motor.

5. In an electric motor, an armature, a commutator, a pair of main brushes, a pair of auxiliary brushes, each brush of a pair mounted midway between the brushes of the other pair, a field-structure including series coils, shunt coils and auxiliary coils, the series coils being connected in series with the main brushes, the auxiliary coils being connected across the auxiliary brushes, and the shunt coils being connected across an auxiliary brush and a main brush, said auxiliary coils being positioned normally in the field so that no current flows therethrough, and means supporting all the brushes for shifting the same simultaneously on the commutator in either direction from said normal position, effective to position the auxiliary brushes to cause current to flow through the auxiliary coils in either direction at will, and to modify concomitantly therewith the current through the shunt coils to co-operate with the auxiliary coils, to influence the magnetic flux of the field and thereby control the speed of the motor.

6. In an electric motor, an armature, a commutator, a pair of main brushes, a pair of auxiliary brushes, each brush of a pair mounted between the brushes of the other pair, a field-structure including series coils, shunt coils and auxiliary coils, the series coils being connected in series with the main brushes, the auxiliary coils being connected across the auxiliary brushes, and the shunt coils being connected across an auxiliary brush and a main brush, and means for adjusting the brushes on the commutator, the magnetic flux of the series field-coils being in the same direction as the magnetic flux of the shunt field-coils, the magnetic influence of the auxiliary field-coils operating in the same direction as the flux of the shunt and series field-coils when the auxiliary brushes are adjusted in one direction, and in the opposite direction when the auxiliary brushes are adjusted in the opposite direction, effective to control the strength of the resultant magnetic flux of the field and thereby control the speed of the motor.

ALFRED E. OSWALD.